United States Patent [19]

Kydonieus

[11] 4,119,267
[45] Oct. 10, 1978

[54] BLOOD AND INTRAVENOUS SOLUTION BAG

[76] Inventor: Agis Frank Kydonieus, 1409 - 2nd Ave., New York, N.Y. 10021

[21] Appl. No.: 715,584

[22] Filed: Aug. 18, 1976

[51] Int. Cl.² .................. B65D 31/02; B65D 37/00
[52] U.S. Cl. .................................. 229/53; 128/272
[58] Field of Search .............. 128/DIG. 24, 214 B, 128/272; 229/3.5 R, 53, 57; 206/524.1–524.3, 438; 428/483; 150/8

[56] References Cited

U.S. PATENT DOCUMENTS

| | | | |
|---|---|---|---|
| 2,245,675 | 6/1941 | Hultin | 229/55 |
| 2,265,075 | 12/1941 | Knuetter | 229/57 |
| 3,235,168 | 2/1966 | Nichols | 229/55 |
| 3,298,597 | 1/1967 | Bellamy, Jr. | 229/55 |
| 3,642,047 | 2/1972 | Waage | 150/8 |
| 3,788,374 | 1/1974 | Saijo | 150/8 |
| 3,872,525 | 3/1975 | Lea | 150/8 |
| 3,915,212 | 10/1975 | Bujan | 150/8 |
| 3,942,529 | 3/1976 | Waage | 128/DIG. 24 |
| 3,958,065 | 5/1976 | Ranck | 428/483 |
| 3,963,026 | 6/1976 | Herb | 128/214 D |
| 4,008,352 | 2/1977 | Dawes et al. | 428/483 |

*Primary Examiner*—Herbert F. Ross
*Attorney, Agent, or Firm*—Sughrue, Rothwell, Mion, Zinn and Macpeak

[57] ABSTRACT

A bag for blood and/or intravenous solutions and a method of making the bag are disclosed. The bag preferably comprises a polyvinyl chloride outer layer and an inner layer which is laminated to the outer layer, which covers substantially the entirety of the surface which, during use of the bag, comes in contact with blood and/or intravenous solution contained in the bag, and which is made from a material, preferably Mylar, which does not hydrolyze and/or leach into blood or intravenous solutions. Other materials may be used for both the inner and the outer layer, and the bag may be used to contain things other than blood and/or intravenous solutions.

15 Claims, 20 Drawing Figures

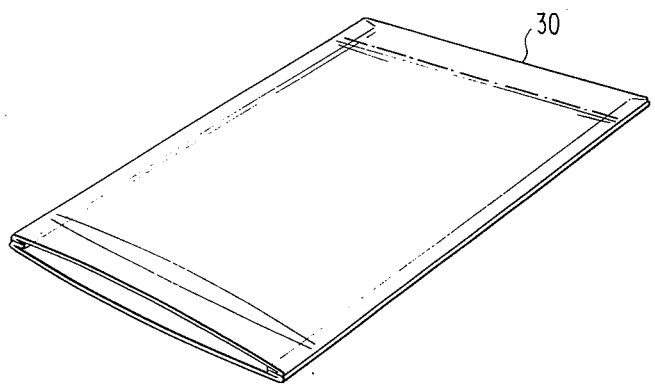
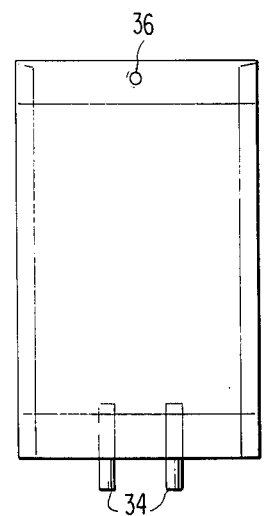
FIG.7  FIG.8
FIG.9  FIG.9A  FIG.10  FIG.10A
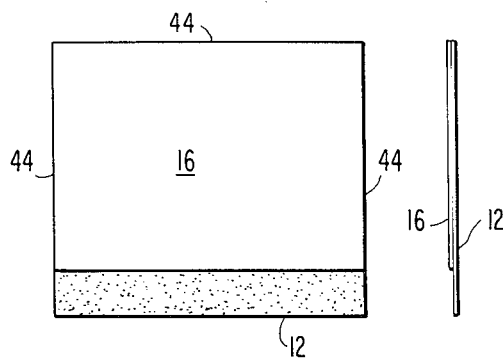
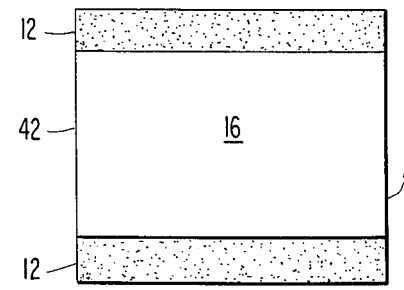
FIG.11  FIG.11A  FIG.12  FIG.12A
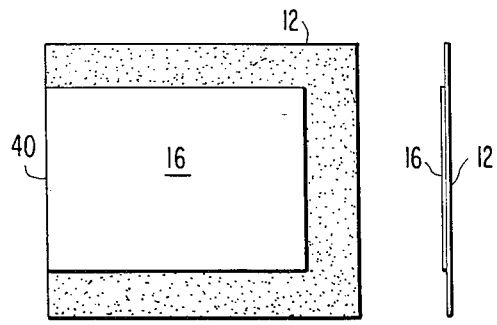
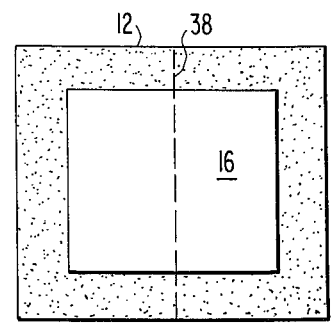
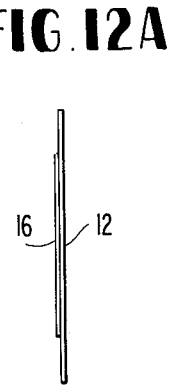

BLOOD AND INTRAVENOUS SOLUTION BAG

FIELD OF THE INVENTION

This invention pertains to bags which are strong and flexible, but which will not leach and/or hydrolyze into the contents of the bag. The bags are particularly suitable for delivering whole blood, blood components, and/or intravenous solutions to humans or animals.

BACKGROUND OF THE INVENTION

It is apparent that blood and intravenous solution bags made from polyvinyl chloride (hereinafter referred to as "PVC") have all but completely superseded glass containers in delivery of blood and/or intravenous solutions to humans or animals. However, there is still a great deal of dissatisfaction with PVC bags because large amounts of DOP plasticizers and vinyl chloride monomers leach and/or hydrolyze into the blood and/or intravenous solutions contained in PVC bags and ultimately find their way into humans and animals being treated. Therefore, a great deal of research has been conducted in attempts to develop new plastics which can be used to make blood and intravenous solution bags and which will not hydrolyze and/or leach into blood or intravenous solutions.

A material for use in making blood and intravenous solution bags should have the following properties:

(1) It should be clear (preferably, transparent);
(2) it should be able to withstand autoclaving at 240° F. to 270° F.
(3) it should be suitable for film-forming and/or extrusion;
(4) it should be fairly soft to the hand;
(5) it should be capable of withstanding a drop of six feet when full;
(6) it should be suitable for heat sealing;
(7) it should have a price which is not prohibitive (preferably, under $2/pound); and
(8) it should not hydrolyze and/or leach into blood or intravenous solutions.

PVC passes all of the above tests except #8, which is probably the most important one and which is why the medical profession is still not happy with present-day PVC bags. As far as other commercially available materials are concerned, test #2 eliminates all available materials except Mylar, nylon, polycarbonates, polysulfones, some polyurethanes, some silicones, cellulose, cellulose triacetate, fluorinated ethylene, polytetrafluoroethylene, polyfluorochloroethylene and polyvinyl alcohol. Mylar is unacceptably stiff when more than a mil or two thick; it is unacceptably weak unless it is considerably thicker than that, and it cannot be heat-sealed properly. (Bar heat sealing is possible, but the required temperatures are such that the material immediately next to the heat seal is annealed, and bags formed from bar heat sealed Mylar accordingly do not have the required strengths). Inability to obtain leak-proof heat sealing eliminates cellulose, cellulose triacetate and polytetrafluoroethylene. High water absorption and permeation eliminates nylons, polycarbonates and polyvinyl alcohols. Price, as well as other deficiencies, such as stiffness, lack of clarity, and inability to obtain leak-proof heat sealing, eliminates fluoronated ethylene, polyfluorochloroethylene and polysulfones.

Probably the most promising candidates known heretofore for replacing PVC in blood and intravenous solution bags are some of the silicones and polyurethanes. They are soft, have a good hand feel, are clear, and some of them can withstand temperatures of up to 250° F. Unfortunately, all of these materials hydrolyze, producing unwanted chemicals such as amines and esters. In addition, the commercially available polyurethanes and silicones are either not heat sealable or not autoclavable.

SUMMARY OF THE INVENTION

This invention is of a bag which meets all eight of the above tests and of a method for producing such a bag. The bag preferably comprises a PVC outer layer and an inner layer which is laminated to the outer layer, which covers substantially the entirety of the surface which, during use of the bag, comes in contact with the contents of the bag, and which is made from a material which does not hydrolyze and/or leach into the contents of the bag.

BRIEF DESCRIPTION OF THE DRAWINGS

FIG. 7 shows the basic bag according to this invention;

FIG. 8 shows the bag of FIG. 7 with ports and an accessory hanger added;

FIGS. 9-12 show alternative laminates from which a bag according to this invention can be made;

DETAILED DESCRIPTION OF THE PREFERRED EMBODIMENTS

Figure 1:
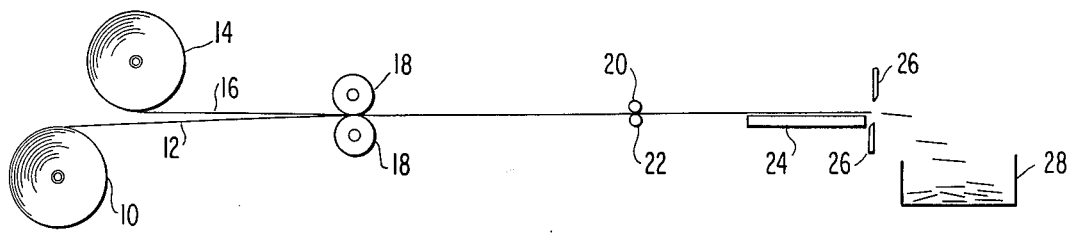
FIG. 1 is a side view of apparatus which can be used in the making of bags according to this invention.
Figure 2:
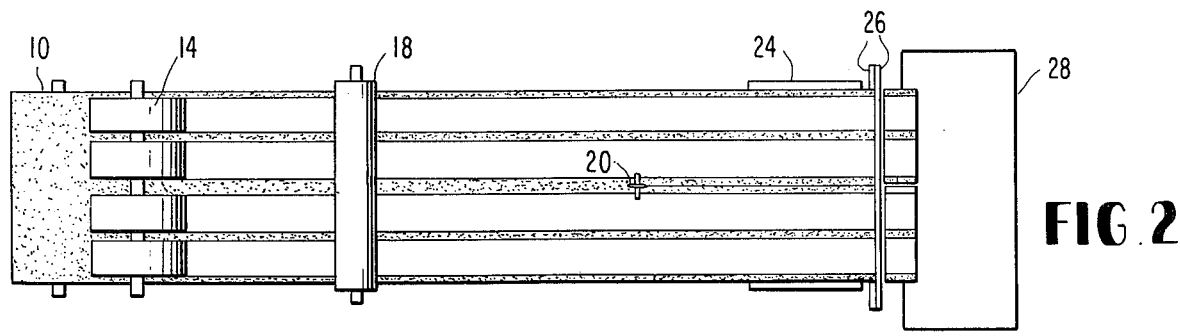
FIG. 2 is a plan view of the apparatus shown in FIG. 1.
Figure 3:
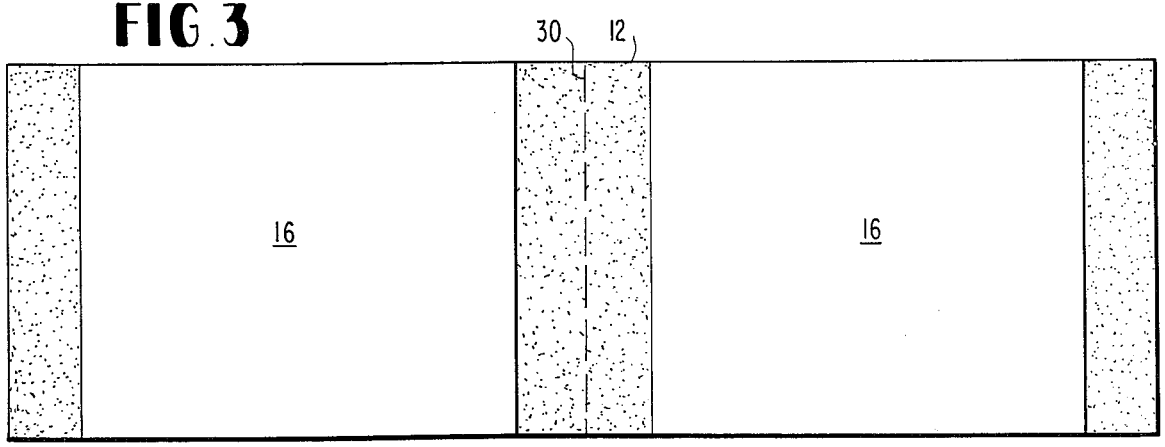
FIG. 3 is a plan view of a laminate from which a bag according to this invention can be made.

FIGS. 1 and 2 show in schematic form apparatus which can be used to produce the laminate shown in FIG. 3. Similar apparatus can be used to produce the laminate shown in FIG. 10. Apparatus for producing the laminates shown in FIGS. 9, 11 and 12 is not shown, but obviously, simple clam-shell type laminating presses could be used to produce all of them. Also obviously, other apparatus, such as the apparatus shown in FIGS. 13 and 14, could be used to produce the laminates shown in FIGS. 3, 10 and 12.

The apparatus shown in FIGS. 1 and 2 comprises a roll 10 of a flexible polymer film 12 having a durometer value of between 60 and 80 (preferably around 70) and a thickness of 1 to 25 mils, a plurality of coaxially mounted rolls 14 of a film 16 made from a material which does not hydrolyze and/or leach into the contents of the bag, a pair of heated press rollers 18 which laminate the film 16 to the film 12, a rotary knife 20 and a cooperating platen 22 for slitting the product of the press rollers 18 into the desired width, a table 24 for supporting the strips of laminate, cooperating high speed sheer knives 26 for cutting the strips of laminate into sections of the desired length, and a bin 28 for collecting the laminate sections. As shown, the width of the roll 10 is equal to a convenient multiple of the width of the desired laminate, and the rolls 14 are axially spaced by a distance corresponding to the desired width of non-laminated film 12. Film 16 could be pretreated for proper adhesion to film 12 or an adhesive applied in situ prior to lamination.

The film 12 is preferably clear, and it is most preferably formed from PVC, particularly when the bag is to be used to contain blood and/or intravenous solutions. However, polyurethane, silicones and polyvinyl fluoride could also be used.

The film 16 may be made of Mylar or any other polymer which passes all of the above-mentioned tests except tests #'s 2, 4, 5, 6 and 7 in which they can be deficient. Appropriate materials besides Mylar are polypropylene film, polybutene film, polycarbonate film, Tedlar, high density polyethylene, fluoronated ethylene, polyfluorochloroethylene and polytetrafluoroethylene. The film 16 is appropriately between ½ mils and 2 mils in thickness.

The common feature of the laminates shown in FIGS. 3 and 9–12 is that the film 16 is laminated to the film 12 in such a way that on at least one of the sides of the laminate the film 12 projects further than the film 16. The projection of the film 12 beyond the film 16 is used in producing the desired bag from the illustrated laminates in the manner explained hereinafter with specific reference to each laminate.

Figure 4:
FIG. 4 illustrates a step in producing a bag according to this invention from the laminate shown in FIG. 3.
Figure 5:
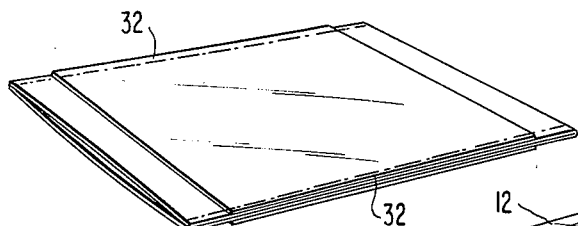
FIG. 5 illustrates an intermediate product formed during production of a bag according to this invention.
Figure 6:
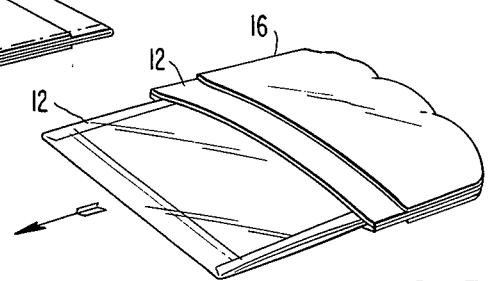
FIG. 6 illustrates the next step in producing a bag according to this invention.

The FIG. 3 laminate is first folded along the line 30 to place the film 16 on the outside, as illustrated in FIG. 4. (Note that the thickness of the film 16 relative to the film 12 is much exaggerated in the drawings for ease of illustration). Next, the lateral edges are heat-sealed together along the lines 32, as illustrated in FIG. 5. Next, the bag is pulled inside out, as illustrated in FIG. 6, to get the film 16 on the inside. Next, as illustrated in FIG. 7, the end of the bag by the foldline 30 is heat sealed up to the edge of the film 16 in order to substantially eliminate contact between the contents of the bag and the film 12 at that end. Finally, as illustrated in FIG. 8, ports 34 are placed in position, the open end of the bag is heat sealed around the ports up to the edge of the film 16 in order to substantially eliminate contact between the contents of the bag and the film 12 at that end, and an accessory hanger 36 is emplaced in the bottom of the bag. (It should be noted that the ports can be made of Mylar treated with the same adhesive as film 16). Of course, the order of the last several steps can be varied, and the ports 34 and the accessory hanger 36 can be omitted if the bag is to be used for a purpose other than to contain blood and/or intravenous solutions — as, for instance, a frozen food container.

Of the laminates shown in FIGS. 9 through 12, the one shown in FIG. 12 would be the easiest to work with. A bag according to the present invention can be made from the laminate shown in FIG. 12 in either of two ways. In the first way, two such laminates would be brought into facing relationship with the films 16 in contact, and the films 12 would be heat sealed around the edges. In the second way, one such laminate could be folded in the middle along a fold line 38 so as to bring the film 16 on the two sides into contact, and then the edges would be heat sealed as before.

In the case of the laminate shown in FIG. 11, two laminates would be placed back to back (i.e., with the films 12 touching), the films 12 would be heat sealed along the edge 40, the laminates folded so that the films 16 touch, and then the rest of the bag heat sealed.

In the case of the laminate shown in FIG. 10, a bag according to the invention can be made in either of two ways. In the first way, two laminates would be placed back to back, the films 12 heat sealed along the edges 42, the tube thus formed pulled inside out, and the rest of the bag sealed. In the second way, two laminates would be placed face to face, the edge 42 folded in to bring the films 12 into contact all along those edges, and the bag would then be heat sealed directly all around its edges.

Finally, two laminates as shown in FIG. 9 can be placed back to back, the film 12 heat sealed along the edges 44, the bag pulled inside out, and the remaining edge heat sealed.

Of course, ports and accessory hangers as shown in FIG. 8 could be added to the bags made from the laminates shown in FIGS. 9 through 12 if the bags were to be used to contain blood and/or intravenous solutions.

It should also be noted that, if the film 16 will heat seal to itself at a temperature below that at which the film 12 will heat seal to itself, then the inner layer, made of the film 16, can be heat sealed to itself at the same time the outer layer is heat sealed to form the bag. Accordingly, the solution contained in the bag can be completely separated from the film 12, which is particularly advantageous with blood bags where the film 12 is PVC. PVC heat seals between 275° and 350° F., medium density polyethylene heat seals between 250° and 400° F., high density polyethylene between 260° and 425° F., polypropylene between 260° and 375° F., Mylar (polyester) between 325° and 450° F., polycarbonate between 350° and 440° F., fluorinated ethylene between 575° and 700° F., Tedlar (polyvinyl fluoride) between 400° and 425° F., and polytriflurochloroethylene between 325° and 375° F. Thus it is apparent that polyethylenes, polypropylenes, and polybutenes can be handled in this way, while Mylar and polytrifluorochloroethylene are marginal.

Figure 13:
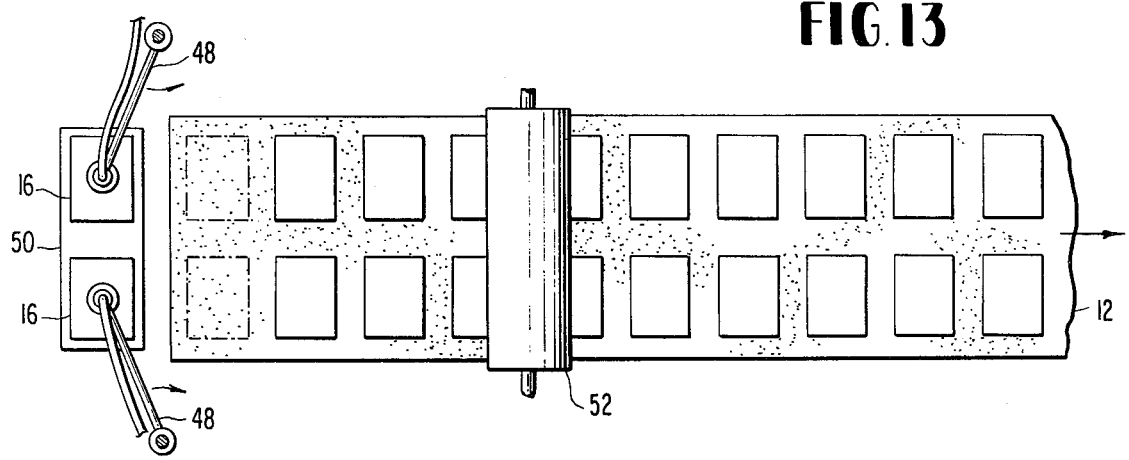
FIG. 13 is a plan view of a second type of apparatus which can be used in the making of bags according to this invention.
Figure 14:
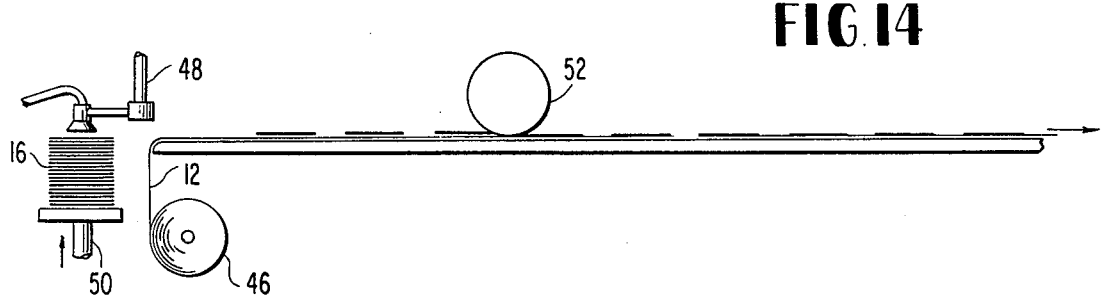
FIG. 14 is a side view of the apparatus shown in FIG. 13.
Figure 15:
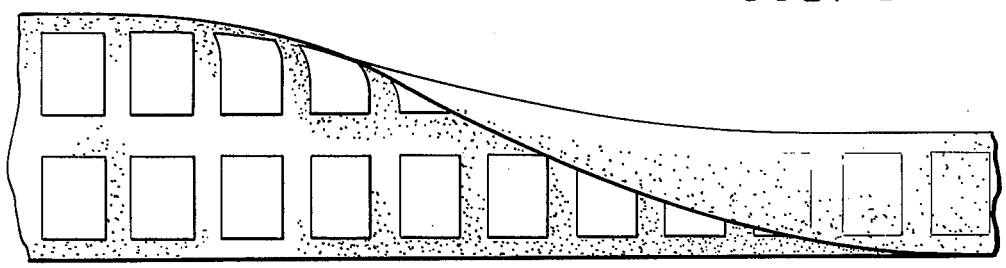
FIG. 15 illustrates a step in producing a bag according to this invention from the laminate produced by the apparatus shown in FIGS. 13 and 14.
Figure 16:
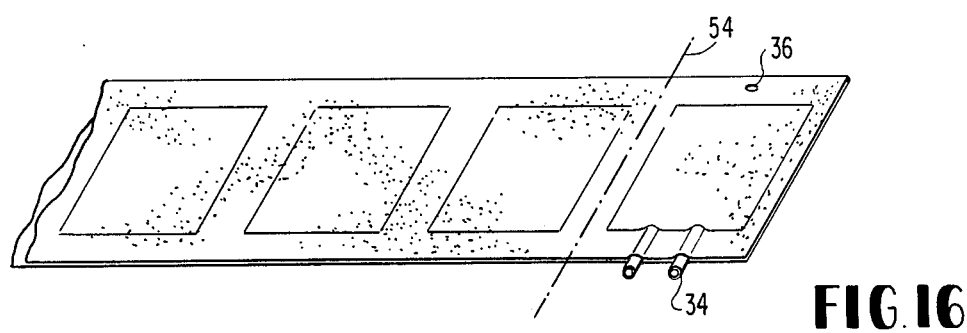
FIG. 16 illustrates subsequent steps in producing a bag according to this invention from the laminate produced by the apparatus shown in FIGS. 13 and 14.

The apparatus shown in FIGS. 13 and 14 can also be used to produce a laminate which can be formed into bags within the scope of the present invention. It comprises a roll 46 of the flexible polymer film 12, a pair of coordinated vacuum arms 48 swingably mounted for removing individual, previously generated sheets of the film 16 from an automatically height-regulated table 50, and a heated press roller 56 which laminates the film 16 to the film 12. Since the vacuum arms 48 and the table 50 are of types well known in materials handling, they will not be described further herein. However, it should be noted that the sheets of the film 16 placed on the film 12 by the two vacuum arms 48 are the same size and are placed on the film 12 in spaced pairs with the film 12 projecting further than the film 16 on each side of each sheet, as shown. The laminate produced by the apparatus shown in FIGS. 13 and 14 is then folded as shown in FIG. 15 so that the sheets in each spaced pair of sheets of the film 16 are superimposed on each other, ports 34 and accessory hangers 36 are placed in position, the film 12 is heat sealed around the edge of the sheets of the film 16, and the individual bags are separated from one another along the lines 54 between each spaced pair of sheets of the film 16.

CAVEAT

While the present invention has been illustrated by detailed descriptions of a number of preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. A bag for blood and/or intravenous solutions formed from two rectilinear polymeric sheet panels disposed substantially parallel to each other, joined at the respective edges thereof forming a cavity and having at least one hollow cylinder disposed transversely between the edges of said panels on one edge of the bag to connect the cavity portion of the bag with the exterior of the bag, wherein each panel comprises:
    (A) an outer layer of a flexible, heat sealable polymer film having a durometer value between 60 and 80 laminated to
    (B) an inner layer, made from a material which does not hydrolyze and/or leach into blood or intravenous solutions, disposed only in the cavity portion of said bag which comes into contact with the blood and/or intravenous solutions wherein the four edges of the bag are formed, at least in part, by the heat sealing to each other of the corresponding outer layers (A) and wherein on at least one edge of the bag the outer layers (A) of each panel project further outwardly than the inner layers (B) and are heat sealed to each other at said projecting portions to form at least one edge of the bag wherein said outer layer (A) is a polymer selected from the group consisting of polyvinyl chloride, polyurethane, silicone or polyvinyl fluoride and said inner layer B) is selected from the group consisting of polyethylene terephthalate, polypropylene, polybutene, polycarbonate, high density polyethylene, fluoromethylethylene, polyfluorochloroethylene, polytetrafluoroethylene, polytrifluorochloroethylene, fluorinated ethylene or polyvinylfluoride.

2. The bag as recited in claim 1, wherein on said at least one edge where the outer layers (A) of each panel project further outwardly than the inner layers (B) and are heat sealed to each other at said projecting portions to form at least one edge of the bag, the inner layers (B) are heat sealed to each other.

3. The bag as recited in claim 1, wherein said outer layer (A) is polyvinyl chloride 4. The bag as claimed in claim 1, wherein said outer layer (A) is polyvinyl chloride and said inner layer (B) is polyethylene terephthalate.

5. The bag as claimed in claim 1, wherein said inner layer thickness if from ½ to 2 mils and said outer layer thickness is from 1 to 25 mils.

6. The bag as recited in claim 1, wherein at least one edge of the bag is inwardly folded with said outer layers (A) heat sealed to each other to define a four-ply flange extending inwardly into the cavity portion of the bag, the two outermost plies of said flange being the inner layers (B) with the two innermost plies of said flange being the outer layers (A).

7. The bag as recited in claim 1, wherein at least one edge of said bag is inwardly folded with said inner layers (B) being heat sealed to each other and extending inwardly farther than said outer layers (A) which are additionally heat sealed to each other.

8. The bag as recited in claim 1, wherein said outer layer (A) is polyvinyl chloride and said inner layer (B) is polybutene.

9. A bag for blood and/or intravenous solutions formed from two rectilinear polymeric sheet panels disposed substantially parallel to each other, joined at the respective edges thereof forming a cavity and having at least one hollow cylinder disposed transversely between the edges of said panels on one edge of the bag to connect the cavity portion of the bag with the exterior of the bag, wherein each panel comprises:
    (A) an outer layer of a flexible, heat sealable polymer film having a durometer value between 60 and 80 laminated to
    (B) an inner layer, made from a material which does not hydrolyze and/or leach into blood or intravenous solutions, disposed only in the cavity portion of said bag which comes into contact with the blood and/or intravenous solutions
wherein the four edges of the bag are formed, at least in part, by the heat sealing to each other of the corresponding outer layers (A) and wherein at least one edge of the bag is inwardly folded with said outer layers (A) heat sealed to each other and said inner layers (B) project further inwardly than said outer layers (A) and are additionally heat sealed to each other.

10. The bag is recited in claim 9, wherein said outer layer (A) is a polymer selected from the group consisting of polyvinyl chloride, polyurethane, silicone or polyvinyl fluoride and said inner layer (B) is selected from the group consisting of polyethylene, terephthalate, polypropylene, polybutene, polycarbonate, high density polyethylene, fluoromethylethylene, polyfluorochloroethylene, polytetrafluoroethylene, polytrifluorochloroethylene, fluorinated ethylene or polyvinylfluoride.

11. The bag as recited in claim 10, wherein said outer layer (A) is polyvinyl chloride and said inner layer (B) is polyethylene terephthalate.

12. The bag as recited in claim 9, wherein said inner layer thickness is from ½ to 2 mils and said outer layer thickness is from 1 to 25 mils.

13. The bag as recited in claim 11, wherein the outer layers (A) of said panels project further than said inner layers (B) on at least one edge and are heat sealed to each other at said projecting portions to form at least one closed edge of said bag.

14. The bag as recited in claim 11, wherein the outer layers (A) of said panels are heat sealed to each other and project further than said inner layers (B) which are heat sealed to each other, on at least one edge to form at least one closed edge of said bag.

15. The bag as recited in claim 10, wherein said outer layer (A) is polyvinyl chloride and said inner layer (B) is polybutene.

* * * * *